United States Patent
Nishinomiya et al.

(10) Patent No.: US 7,357,280 B2
(45) Date of Patent: Apr. 15, 2008

(54) FOODSTUFF FEEDING APPARATUS AND FEEDING METHOD

(75) Inventors: Takeshi Nishinomiya, Gunma (JP); Ishii Yoichiro, Gunma (JP)

(73) Assignee: Ajinomoto Co., Inc., Tokyo (JP)

( * ) Notice: Subject to any disclaimer, the term of this patent is extended or adjusted under 35 U.S.C. 154(b) by 577 days.

(21) Appl. No.: 10/995,422

(22) Filed: Nov. 24, 2004

(65) Prior Publication Data

US 2005/0199135 A1 Sep. 15, 2005

(30) Foreign Application Priority Data

Nov. 25, 2003 (JP) ............... 2003-394315
Nov. 15, 2004 (JP) ............... 2004-330287

(51) Int. Cl.
*B65D 88/54* (2006.01)

(52) U.S. Cl. .............. 222/252; 222/278; 222/363; 222/380

(58) Field of Classification Search .............. 222/252, 222/278, 363, 368, 380

See application file for complete search history.

(56) References Cited

FOREIGN PATENT DOCUMENTS

| JP | 49-126866 | 12/1974 |
|---|---|---|
| JP | 52-102483 | 8/1977 |
| JP | 09-313152 | 12/1997 |
| JP | 2003-024027 | 1/2003 |

*Primary Examiner*—Philippe Derakshani
(74) *Attorney, Agent, or Firm*—Oblon, Spivak, McClelland, Maier & Neustadt, P.C.

(57) ABSTRACT

A foodstuff feeding apparatus to convey foodstuff to a metering unit from a hopper without masking or kneading the foodstuff. The apparatus includes a piston pump provided between a lower portion of a hopper and an end of a first pipe to draw foodstuff from the hopper and to press out the drawn foodstuff into the first pipe toward a metering unit. A draw-side valve is provided between the lower portion of the hopper and the piston pump, a discharge-side valve is provided between the piston pump and the first pipe, and setting is made such that when the draw-side valve is opened and the discharge-side valve is closed, the piston pump draws the foodstuff, and when the draw-side valve is closed and the discharge-side valve is opened, the piston pump presses out the foodstuff, and that the piston pump presses out the foodstuff into the first pipe.

14 Claims, 6 Drawing Sheets

FOODSTUFF FEEDING APPARATUS AND FEEDING METHOD

CROSS REFERENCE TO RELATED APPLICATION

The present application claims priority to Japanese patent application No. 394315/2003 filed on Nov. 25, 2003 and No. 2004-330287 filed on Nov. 15, 2004, which are incorporated by reference herein in their entirety.

BACKGROUND OF THE INVENTION

1. Field of the Invention

This invention relates to a foodstuff feeding apparatus and a method of feeding foodstuff to divide the foodstuff in fixed quantities while keeping it in shape without mashing, or kneading the foodstuff and to feed the same to a subsequent process.

2. Discussion of the Background

Conventionally, a quantitative feeder frequently used in shao-mai manufacturing apparatuses includes a gear pump provided at a lower end of a hopper provided with squeezing blades, which are rotated by, for example, an electric motor. A three-way opened metering unit is provided at a lower end of the gear pump and has a switchover cock, where the first opening is connected to the gear pump, the second opening is connected to a pipe, through which foodstuff is conveyed to a subsequent process, and the third opening is connected to a cam mechanism interlocking with a metering piston. Foodstuff is charged into the hopper with the quantitative feeder. The foodstuff is introduced into the metering unit by successive predetermined amounts by the squeezing blades and the gear pump. The switchover cock in the metering unit reciprocates in a manner to alternately connect between the first opening and the third opening and between the third opening and the second opening, and simultaneously therewith the metering piston reciprocates for drawing and pressing-out to feed the foodstuff to the subsequent process through the pipe. (See JP-A-49-126866.)

Also, there are apparatus configurations in which a pipe for conveyance of foodstuff to a subsequent process is connected to a forward side of a horizontal type hopper provided with a screw conveyor, and a pressure regulating valve provided midway the pipe acts to regulate pressure in the pipe for conveyance of foodstuff to the subsequent process (see JP-A-52-102483). And there are apparatus configurations in which a screw conveyor provided at a bottom of a horizontal hopper feeds foodstuff into a pump such as a paddle pump or the like, a pipe is connected to a discharge port of the pump to permit the foodstuff to be conveyed to a subsequent process, a constant pressure cylinder is provided midway the pipe, and the pump is varied in speed by travel of the constant pressure cylinder to regulate pressure in the pipe for conveyance of foodstuff to the subsequent process (see JP-A-2003-24027). Further, there is an apparatus configuration in which a screw conveyor is provided in a cylindrical-shaped casing and gas introduction means for feeding pressurized gases inside the casing from outside is provided to be able to convey an even sticky foodstuff to a subsequent process in predetermined quantities (see JP-A-9-313152).

DISCLOSURE OF THE INVENTION

Problems that the Invention is to Solve

Since various materials such as vegetables, shrimp, meat pieces, etc. are mixed in foodstuff being conveyed in a foodstuff feeding apparatus, the foodstuff is conveyed from a hopper to a metering unit under conditions of very poor flowability, and metered and divided in the metering unit to be fed to a subsequent process. Therefore, conveyance of foodstuff is carried out in a state in which the foodstuff is appropriately pressurized. On the other hand, cooked and processed foodstuff is preferably not processed when it is homogeneous in a manner that gives the foodstuff an impression of being manufactured by machines, but rather in a manner such that the foodstuff retains the shape of foodstuff as if it is made manually. That is, a foodstuff feeding apparatus is desired to meter and divide foodstuff in a state in which it is not mashed or kneaded in order to give the impression that the foodstuff is made manually.

With the disclosure of JP-A-49-126866, however, the squeezing blades and the gear pump are used, so that foodstuff is put in a mashed and considerably kneaded state by the squeezing blades and teeth of the gear pump. Also, when it is tried to omit the gear pump and to convey foodstuff only by the use of the squeezing blades, it is necessary to increase the squeezing capacity of the squeezing blades and so there is a need for measures such as decreasing a gap between the screw of the squeezing blades and an inner wall of the hopper, increasing the rotational speed of the squeezing blades, configuring the squeezing blades in a manner to increase the feed of foodstuff per revolution of the squeezing blades, or the like. Although quantitativity is heightened by these measures, foodstuff is liable to be sheared and divided by the squeezing blades, so that foodstuff is put in a mashed and considerably kneaded state.

Also, with the disclosure of JP-A-52-102483, foodstuff is sheared and divided by the screw conveyor as described above, so that foodstuff is put in a mashed and kneaded state, and with the disclosure of JP-A-2003-24027, foodstuff is put in a mashed and kneaded state by the screw conveyor, which acts to feed foodstuff into the pump. Further, with the construction, in which the paddle pump is used, the paddle pump is of a type in which a rotary paddle pushes foodstuff, so that foodstuff is not mashed and kneaded comparatively, but the casing is bent 90 degrees between a draw port and a discharge port whereby foodstuff is sheared and divided in a space surrounded by the rotary paddle and the bent casing and kneading is expedited.

In this manner, mashing and kneading of foodstuff cannot be eliminated in a method having a continuously rotating mechanism in a path for conveyance of foodstuff, such as a feeding method using a gear pump and squeezing blades, a feeding method, in which a mechanism assisting conveyance of foodstuff with the use of a screw, a paddle, or the like is included, a conveying method with a pump, such as a paddle pump, a snake pump, etc., which makes use of rotary movements, or the like.

Also, in the case where foodstuff is conveyed in conventional methods, there is a need for pretreatment, which assumes mashing, collapsing, and kneading of foodstuff in the procedure and is directed to realizing a quality demanded when foodstuff makes products, an apparently manually made food feeling (i.e. a homemade or handmade quality), feeling of the existence of ingredients (i.e., appreciable chunks of ingredients in the foodstuff), or the like, so that it is necessary to increase foodstuff in size and in quantity and to suppress damage caused by mixing as far as possible. However, foodstuff in which the feeling of existence of ingredients is desired to be heightened is frequently expensive, and so the product cost is increased when a large quantity of such foodstuff is used assuming mashing. Also, since the degree of mashing and kneading is varied depending upon the physical properties of respective foodstuffs, the operating conditions, etc., it is difficult to estimate the quality of a finished product from the quality in a stage of pretreatment when new products and revised products are to be manufactured, whereby product development is very inefficient.

Hereupon, it is an object of the invention to provide a feeding method and a foodstuff feeding apparatus of simple construction capable of conveying foodstuff to a metering unit from a hopper while maintaining shape of the foodstuff without mashing or kneading, to meter and divide the foodstuff in fixed quantities in the metering unit and to feed the same to a subsequent process.

Means for Solving the Problems

The present invention includes a foodstuff feeding apparatus including a hopper for charging of foodstuff, a first pipe, through which foodstuff is conveyed from the hopper, a metering unit to divide the foodstuff conveyed through the first pipe in fixed quantities, and a second pipe, through which foodstuff is conveyed from the metering unit to a subsequent process. The foodstuff feeding apparatus includes a piston pump provided between a lower portion of the hopper and a hopper-side end of the first pipe to draw the foodstuff from the hopper and to press out the drawn foodstuff into the first pipe. A draw-side valve is provided between the lower portion of the hopper and the piston pump, and a discharge-side valve is provided between the piston pump and the first pipe. The piston pump draws the foodstuff from the hopper when the draw-side valve is opened and the discharge-side valve is closed, and the piston pump presses out the foodstuff into the first pipe when the draw-side valve is closed and the discharge-side valve is opened.

The present invention also includes a second aspect in which piston pumps are provided in plural at the lower portion of the hopper, a draw-side valve is provided to selectively connect between the hopper and draw ports of the respective piston pumps, and a discharge-side valve provided to selectively connect between the first pipe and discharge ports of the respective piston pumps. A setting is made such that while one piston pump is pressing out the foodstuff, another piston pump draws the foodstuff from a hopper.

Further, the present invention includes a third aspect having a feature in that the metering unit includes three-way passages composed of a first switchover passage communicated with the first pipe, a second switchover passage communicated with the second pipe, and a third switchover passage communicated with a metering piston. A switchover cock is provided at an intersection of the three-way passages. The metering piston is caused by reciprocating drive means to draw and press out foodstuff, and the switchover cock is turned by rotary drive means to be alternately stopped in a first position, in which the first switchover passage and the third switchover passage are communicated with each other, and in a second position, in which the second switchover passage and the third switchover passage are communicated with each other. A setting is made such that when the switchover cock is stopped in the first position, the metering piston draws foodstuff from the first pipe through the switchover cock, and when the switchover cock is stopped in the second position, the metering piston presses out foodstuff into the second pipe through the switchover cock.

Also, the present invention includes a fourth aspect having a pressure sensor mounted on the first pipe in the vicinity of the metering unit, an electropneumatic regulator mounted in an air system to regulate that pressure, with which the piston pump is pushed, and a sequencer electrically connected to the pressure sensor and the electropneumatic regulator. The sequencer regulates an opening degree of the electropneumatic regulator so as to control the pressure in the first pipe in the vicinity of the metering unit to a predetermined value.

The present invention includes a fifth aspect of a method of feeding foodstuff to the metering unit from the hopper with the use of a foodstuff feeding apparatus as described above. The method includes consecutively performing a foodstuff drawing step of drawing foodstuff charged into the hopper into a cylinder of the piston pump after opening of the draw-side valve and closing of the discharge-side valve, and a foodstuff pressing-out step of pressing out the foodstuff in the cylinder, into the first pipe by closing the draw-side valve and opening the discharge-side valve, and continuously conveying the foodstuff to the metering unit through the first pipe.

The present invention includes a sixth aspect having a feature in that shrimp is contained in the foodstuff.

DETAILED DESCRIPTION OF THE PREFERRED EMBODIMENTS

Figure 1:
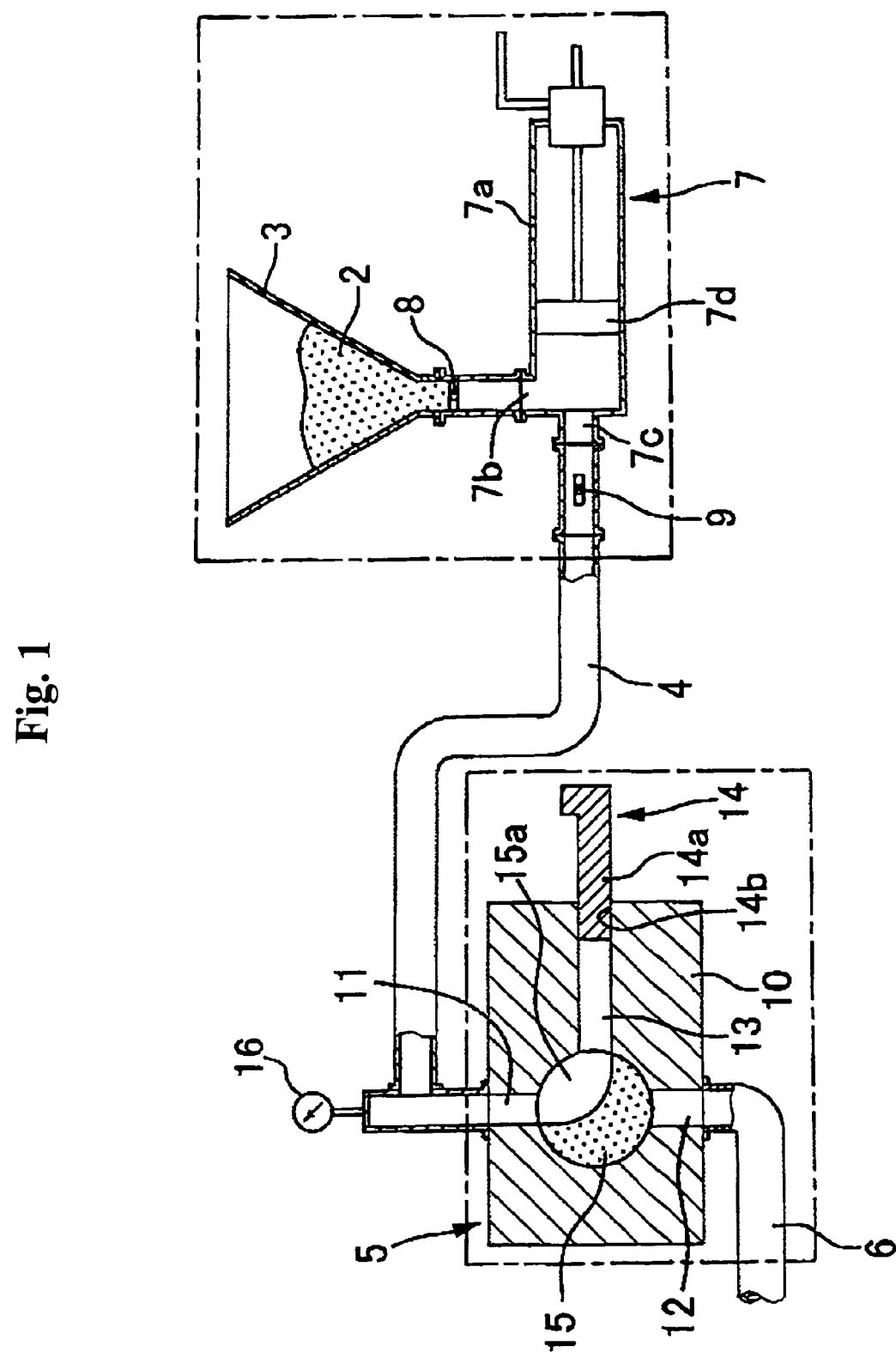
FIG. 1 is a schematic view showing a foodstuff feeding apparatus according to a first embodiment of the invention.
Figure 2:
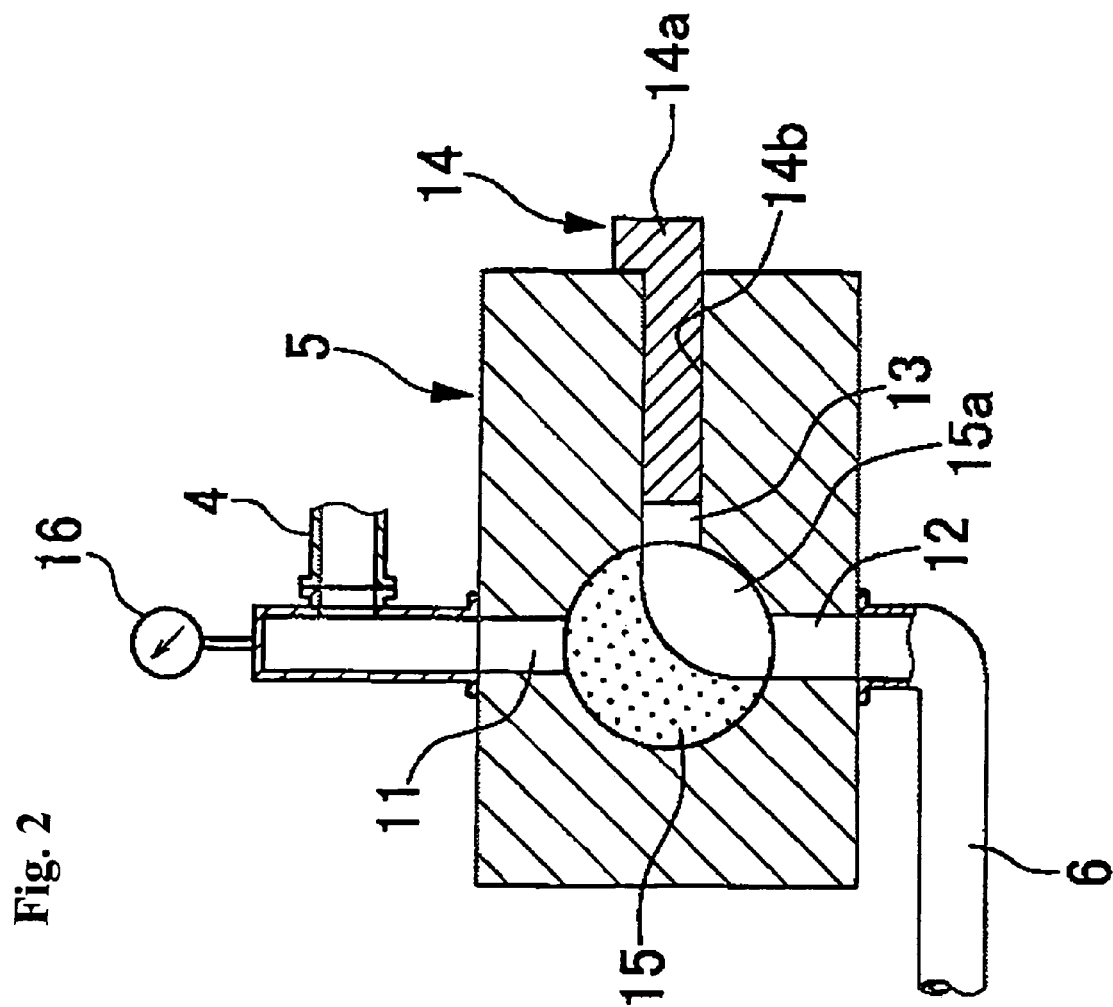
FIG. 2 is a schematic view showing a metering unit according to the first embodiment of the invention.

Various embodiments of the invention will be described below in detail with reference to the drawings. FIGS. 1 and 2 show a first embodiment of the invention including a foodstuff feeding apparatus 1 having a hopper 3, into which foodstuff 2 is charged, a first pipe 4 for conveyance of the foodstuff 2 from the hopper 3, a metering unit 5 to divide the foodstuff 2 conveyed through the first pipe 4 into fixed quantities, and a second pipe 6 for conveyance of the foodstuff 2 from the metering unit 5 to a subsequent process. A piston pump 7 is connected between a lower portion of the hopper 3 and a hopper-side end of the first pipe 4 to draw the foodstuff 2 from the hopper 3 and to press out the drawn foodstuff 2 into the first pipe 4. A draw-side valve 8 is provided between the lower portion of the hopper 3 and the piston pump 7, and a discharge-side valve 9 is provided between the piston pump 7 and the first pipe 4.

The piston pump 7 is provided such that a central axis of a cylinder 7a is made perpendicular to a central axis of the hopper 3. A draw port 7b that communicates with a lower end of the hopper 3 and a discharge port 7c that communicates with an end of the first pipe 4 are provided on a tip end side of the cylinder 7a. A piston 7d is received in the cylinder 7a to be able to reciprocate. The piston pump 7, the draw-side valve 8, and the discharge-side valve 9 are set to draw the foodstuff 2 into the cylinder 7c by pulling the piston 7d (from left to right in FIG. 1) when the draw-side valve 8 is opened and the discharge-side valve 9 is closed, and to press out the foodstuff 2 in the cylinder 7c into the first pipe 4 by pushing the piston 7d (from right to left in FIG. 1) when the draw-side valve 8 is closed and the discharge-side valve 9 is opened.

The metering unit 5 serves to divide the foodstuff 2 introduced through the first pipe 4 into fixed quantities. Three-way passages 11 to 13 are provided in a rectangular-shaped switchover cock casing 10 to comprise a first switchover passage 11 communicated with the first pipe 4, a second switchover passage 12 communicated with the second pipe 6 for conveyance of the foodstuff to a subsequent process, and a third switchover passage 13 communicated with a metering piston 14. A spherical-shaped switchover cock 15 is provided at an intersection of the three-way passages 11 to 13. The switchover cock 15 includes a communication passage 15a for introduction/delivery of the foodstuff, and is operatively turned 90 degrees by rotary drive means (not shown) to be alternately stopped in a first position in which the first switchover passage 11, the communication passage 15a, and the third switchover passage 13 are communicated with one another (as shown in FIG. 1), and in a second position in which the second switchover passage 12, the communication passage 15a, and the third switchover passage 13 are communicated with one another (as shown in FIG. 2). Also, in order that the mechanism divide the foodstuff 2 into fixed quantities, the foodstuff 2, which is pressure-fed through the first pipe 4, is preferably made constant in pressure. Accordingly, a pressure gauge 16 is provided midway along the first pipe 4 to permit the pressure at which the piston pump 7 is pushed to be regulated.

With the use of the foodstuff feeding apparatus 1 formed in this manner, the foodstuff 2 is divided into fixed quantities, and fed to the subsequent process. The foodstuff 2, which was beforehand subjected to mixing treatment, is charged into the hopper 3, the discharge-side valve 9 is closed and the draw-side valve 8 is opened, and the piston 7d of the piston pump 7 is pulled to draw the foodstuff 2 into the cylinder 7c from the hopper 3. Thereafter, the draw-side valve 8 is closed and the discharge-side valve 9 is opened, and the piston 7d is pushed toward the first pipe 4 to press out the foodstuff 2 in the cylinder 7c, into the first pipe 4. After this process is repeated and the foodstuff 2 fills the first pipe 4 up to the metering unit 5, pressure, at which the piston pump 7 is pushed, is confirmed by the pressure gauge 16 to be regulated to a constant pressure, thus starting the metering action of the metering unit 5.

In the metering unit 5, after the switchover cock 15 is first turned and stopped in the first position shown in FIG. 1 to provide communication between the first pipe 4 and the metering piston 14 through the first switchover passage 11, the communication passage 15a, and the third switchover passage 13, a piston 14a of the metering piston 14 is pulled to draw a predetermined amount of the foodstuff 2 into a cylinder 14b from the first pipe 4. Next, after the switchover cock 15 is turned 90 degrees (counterclockwise as shown in FIGS. 1 and 2) and stopped in the second position shown in FIG. 2 to provide communication between the metering piston 14 and the second pipe 6 through the third switchover passage 13, the communication passage 15a, and the second switchover passage 12, the piston 14a of the metering piston 14 is pushed toward the switchover cock 15 to press out a predetermined amount of the foodstuff 2 in the cylinder 14b to the second pipe 6. By repeating such series of actions, the foodstuff is supplied into the subsequent process in series by a predetermined amount. Also, by changing the metering piston 14 in stroke, an amount thus fed can be readily changed.

As described above, since the foodstuff feeding apparatus 1 according to the embodiment uses the piston pump 7 for conveyance of the foodstuff 2 and any continuously rotating mechanism is not provided in a foodstuff conveyance region from the hopper 3 to the metering unit 5, it is possible to favorably convey the foodstuff 2 in its original form to the metering unit 5 without shearing, cutting, mashing, or kneading the foodstuff 2. Also, by providing the pressure gauge 16 midway along the first pipe 4, the pressure of the piston pump 7 is confirmed by the pressure gauge 16 and regulated to a predetermined pressure, and thereafter the foodstuff 2 is conveyed to the metering unit 5, so that the metering unit 5 can surely divide the foodstuff 2 into fixed quantities. Further, the metering unit 5 divides the foodstuff 2 into fixed quantities with the use of the metering piston 14, thereby it is possible to convey the foodstuff 2 in its original form by successive predetermined amounts to the subsequent process from the metering unit 5 without mashing, or kneading the foodstuff 2. Also, the metering unit 5 is specifically excellent as a metering means for molded food, which is small in weight per one piece, such as dumplings, shao-mai, meat dumplings, etc. The switchover cock 15 and the metering piston 14 in the metering unit 5 can be operated interlocking with a molding section in the subsequent process to surely enable feeding a piece of foodstuff to the molding section.

In addition, the draw-side valve 8 and the discharge-side valve 9 can be also replaced by the same three-way valves as the switchover cock 15.

Figure 3:
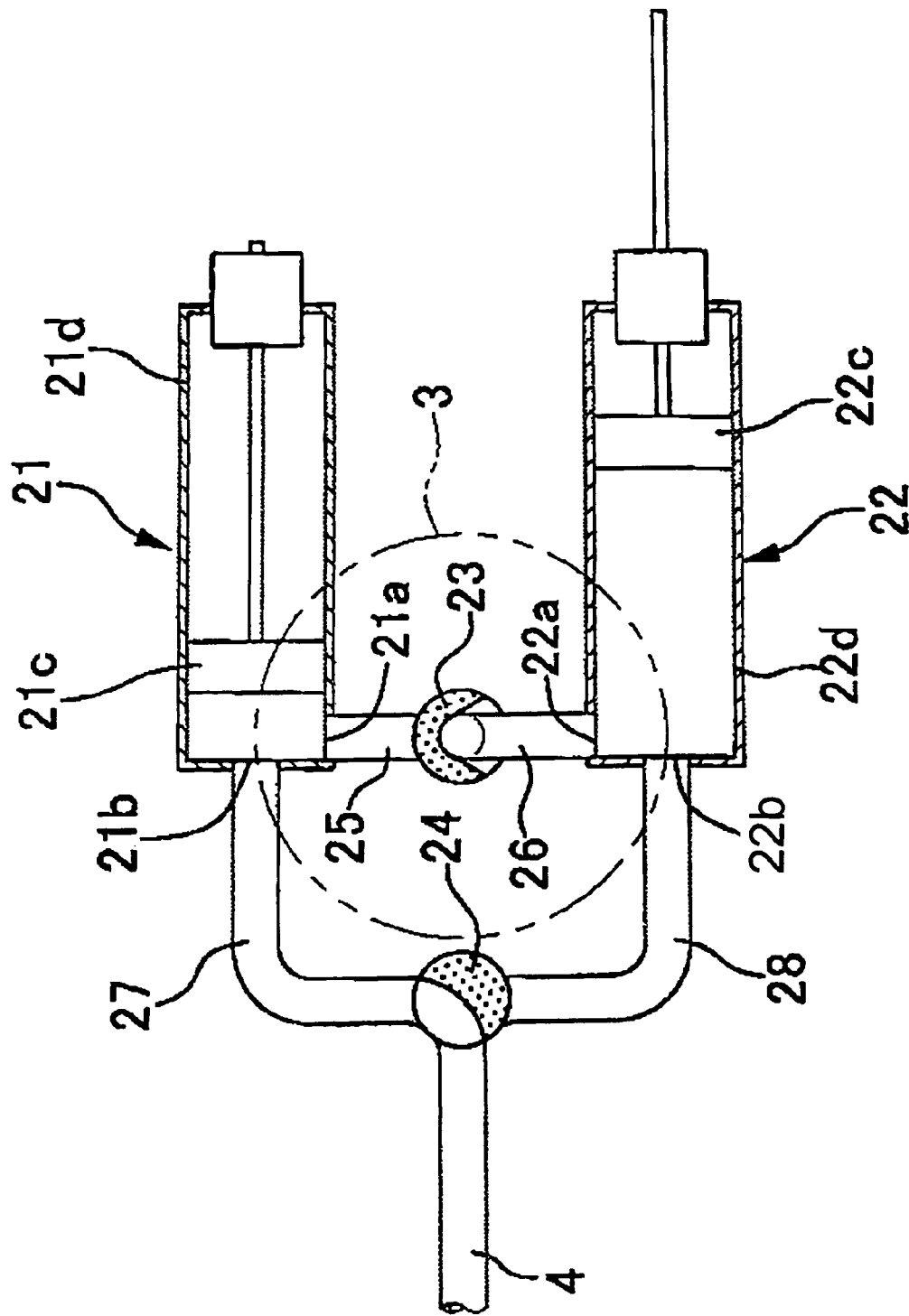
FIG. 3 is a schematic view showing a part of a foodstuff feeding apparatus according to a second embodiment of the invention.

FIG. 3 shows a second embodiment of the invention, in which two piston pumps are provided to draw foodstuff from a hopper, and the same constituent parts as those in the first embodiment are denoted by the same reference numerals, of which detailed explanation is omitted. A foodstuff feeding apparatus 20 according to the second embodiment includes a first piston pump 21 and a second piston pump 22, which are provided below the hopper 3, a draw-side valve 23 to selectively connect between the hopper 3 and draw ports 21a, 22a of the respective piston pumps 21, 22, and a discharge-side valve to selectively connect between the first pipe 4 and discharge ports 21b, 22b of the respective piston pumps 21, 22. The draw-side valve 23 is provided at an intersection of draw pipes 25, 26 connected to the draw ports 21a, 22a of the respective piston pumps 21, 22 and a lower pipe of the hopper 3. The draw-side valve 23 can be switched over to communicate the lower pipe of the hopper 3 with either the first piston pump 21 or the second piston pump 22. The discharge-side valve 24 is connected to discharge pipes 27, 28 connected to the discharge ports 21b, 22b of the respective piston pumps 21, 22, and the discharge-side valve 24 can be switched over to communicate either of the discharge pipes 27, 28 with the first pipe 4.

With the foodstuff feeding apparatus 20, the draw-side valve 23 is first switched over to a side of the first piston pump 21 and the discharge-side valve 24 is switched over to a side of the second piston pump 22 whereby a piston 21c of the first piston pump 21 is pulled to draw the foodstuff 2 into a cylinder 21d. The draw-side valve 23 is switched over to a side of the second piston pump 22 and the discharge-side valve 24 is switched over to a side of the first piston pump 21 whereby the piston 21c of the first piston pump 21 is pushed to press out the foodstuff 2 into the first pipe 4 from the cylinder 21d, and simultaneously therewith a piston 22c of the second piston pump 22 is pulled to draw the foodstuff 2 into the cylinder 22d. The draw-side valve 23 is switched over to the side of the first piston pump 21 and the discharge-side valve 24 is switched over to the side of the second piston pump 22 whereby the piston 22c of the second piston pump 22 is pushed to press out the foodstuff 2 into the first pipe 4 from the cylinder 22d, and simultaneously therewith the first piston pump 21 is used to draw the foodstuff 2 from the hopper 3. By repeating such series of actions, the foodstuff 2 is incessantly conveyed at a constant pressure to the metering unit 5 from the first pipe 4. Also, the series of actions can be automatically switched over through common sequence controls with the use of sensors, which detect positions of the respective piston pumps 21, 22. In addition, the piston pumps are not limited to two in number but may be three or more in number.

Figure 4:
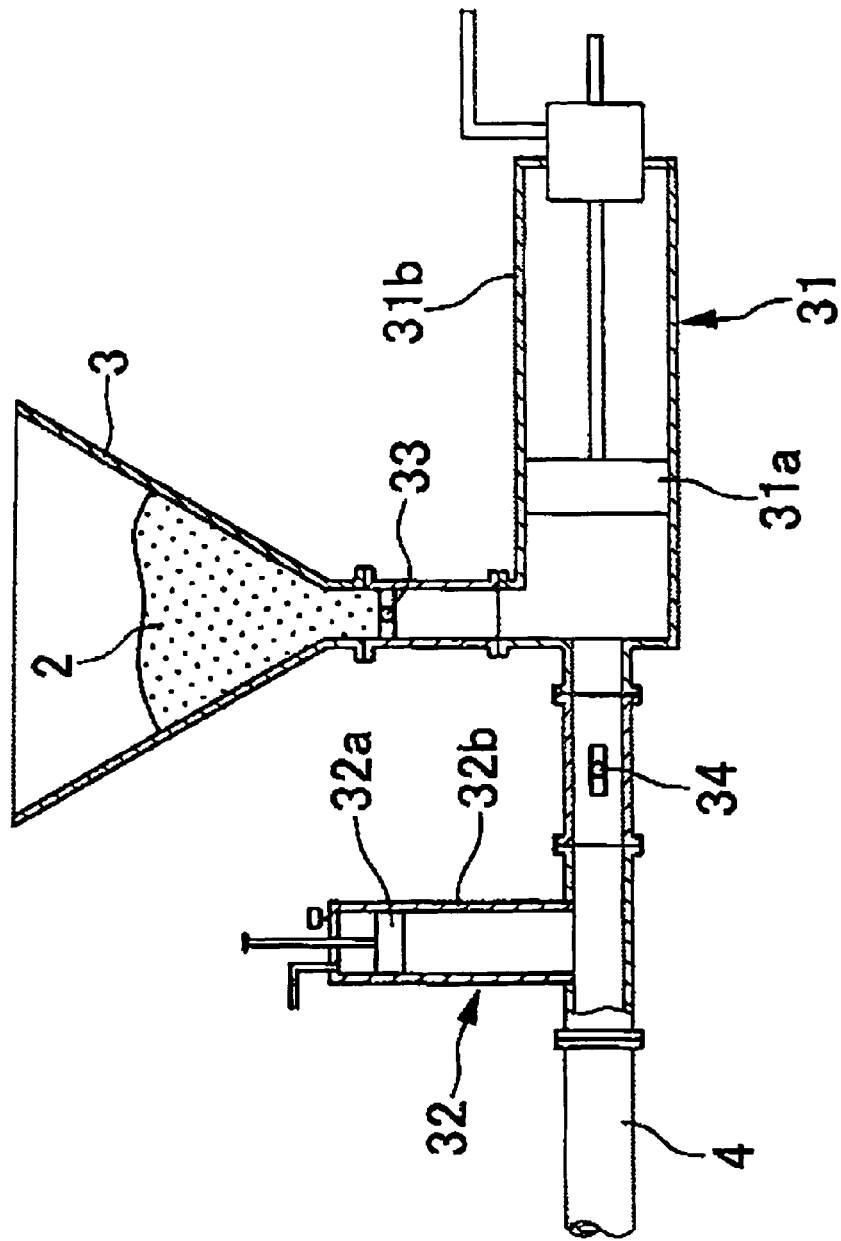
FIG. 4 is a schematic view showing a part of a foodstuff feeding apparatus according to a third embodiment of the invention.

FIG. 4 shows a third embodiment of the invention, in which two piston pumps are provided to draw foodstuff from a hopper, and the same constituent parts as those in the first embodiment are denoted by the same reference numerals, of which detailed explanation is omitted. A foodstuff feeding apparatus 30 according to the third embodiment includes a first piston pump 31 provided between a lower portion of the hopper 3 and an end of the first pipe 4. The first piston pump 31 extends perpendicular to a central axis of the hopper 3. A second piston pump 32 is provided midway along the first pipe 4 and extends perpendicular to the first pipe 4. A draw-side valve 33 is provided between the lower portion of the hopper 3 and the first piston pump 31, and a discharge-side valve 34 is provided on the first pipe 4 between the first piston pump 31 and the second piston pump 32.

With the foodstuff feeding apparatus 30 described above, the draw-side valve 33 is opened and the discharge-side valve 34 is closed whereby a piston 31a of the first piston pump 31 is pulled to draw the foodstuff 2 into a cylinder 31b. After completion of drawing, the discharge-side valve 34 is opened and the draw-side valve 33 is closed whereby the foodstuff 2 is pressed out into the first pipe 4 from the first piston pump 31. At this time, when the second piston pump 32 is pushed at a slightly lower pressure than that pressure in the first pipe 4 generated by the pushing action of the first piston pump 31, differential pressure causes the foodstuff to enter into the second piston pump 32 little by little to push up a piston 32a of the second piston pump 32, and shortly a cylinder 32b of the second piston pump 32 is filled with the foodstuff 2. When the first piston pump 31 has completed discharged, the discharge-side valve 34 is closed and the draw-side valve 33 is opened, whereby the first piston pump 31 again begins the drawing action. Simultaneously therewith, the piston 32a of the second piston pump 32 is pushed down to press out the foodstuff in the second piston pump 32 into the first pipe 4. It suffices to determine volumes of the first piston pump 31 and the second piston pump 32 such that the drawing action of the first piston pump 31 has completed while the second piston pump 32 is pressing out the foodstuff 2, and it suffices to regulate pressure, at which the second piston pump 32 is pushed, such that the second piston pump 32 is filled with the foodstuff while the first piston pump 31 is pressing out the foodstuff. By repeating such series of actions, the foodstuff 2 is incessantly fed at a constant pressure to the metering unit 5 from the first pipe 4. The respective actions can be automatically switched over through common sequence controls with the use of sensors, which detect positions of the both piston pumps 31, 32. A way to fill the foodstuff 2 into the second piston pump 32 is not specifically limited to one described above but it is conceivable to use an electrically driven slider to raise the piston 32a of the second piston pump 32 at a predetermined speed, to repeat intermittently releasing pressure, at which the piston 32a is pushed, or the like, and it suffices that such way afford operation in a range, in which pressure in the first pipe 4 is not much affected, and within a predetermined period of time.

In addition, squeezing blades may be provided in the hopper in the respective embodiments described above. It suffices that the squeezing blades need not be as strong as conventional squeezing blades, which squeeze foodstuff into a metering unit, but can be relatively simple to serve to prevent an air from entering when a piston draws foodstuff. Also, while the first pipe is not specifically limited in thickness and length, they are preferably set suitably according to a kind of foodstuff, output of the piston pumps, etc. because foodstuff is kneaded by the resistance in the first pipe in the case where the first pipe is too small and too lengthy. While pressure in the first pipe is not specifically limitative, care is required because mashing of the foodstuff proceeds when the pressure is too high and pressing-in of the foodstuff into the metering unit becomes incomplete when the pressure is too low. For example, the range of 0.03 MPa to 0.4 MPa is desirable for ingredients for shrimp shao-mai.

Also, the foodstuff used in the embodiments can comprise mixed ingredients for dumplings, shao-mai, hamburger, croquette, etc. and can beforehand be subjected to pretreatment such as mixing or the like in common methods. By the use of the foodstuff feeding apparatus described above, mashing, or kneading of the foodstuff can be prevented, so that any special contrivance is not necessary when the quality in the pretreatment stage is created. Also, foodstuff desired to leave a feeling of existence of the ingredients (e.g. food with large chunks of certain ingredients) is not required to be contained in an overly large amount as is needed when the foodstuff is subjected to mashing or kneading, so that unnecessary cost is held down.

In particular, by beforehand applying pretreatment such as mixing or the like to mixed ingredients (e.g. which contain shrimp as foodstuff, for dumplings, shao-mai, hamburger, croquette, etc.) in common methods, and conveying them by the foodstuff feeding apparatus described above to feed them to the molding section in fixed quantities, mashing or kneading of shrimp can be prevented, the consumer is able to sense the existence of shrimp in the products, and the quality of the food is good. Conventionally, a larger quantity of shrimp than needed is used due to the fact that shrimp loses its appearance while transferred using conventional methods, but a smaller quantity of shrimp is sufficient according to the method of the present invention since mashing or kneading of the shrimp is prevented.

Figure 5:
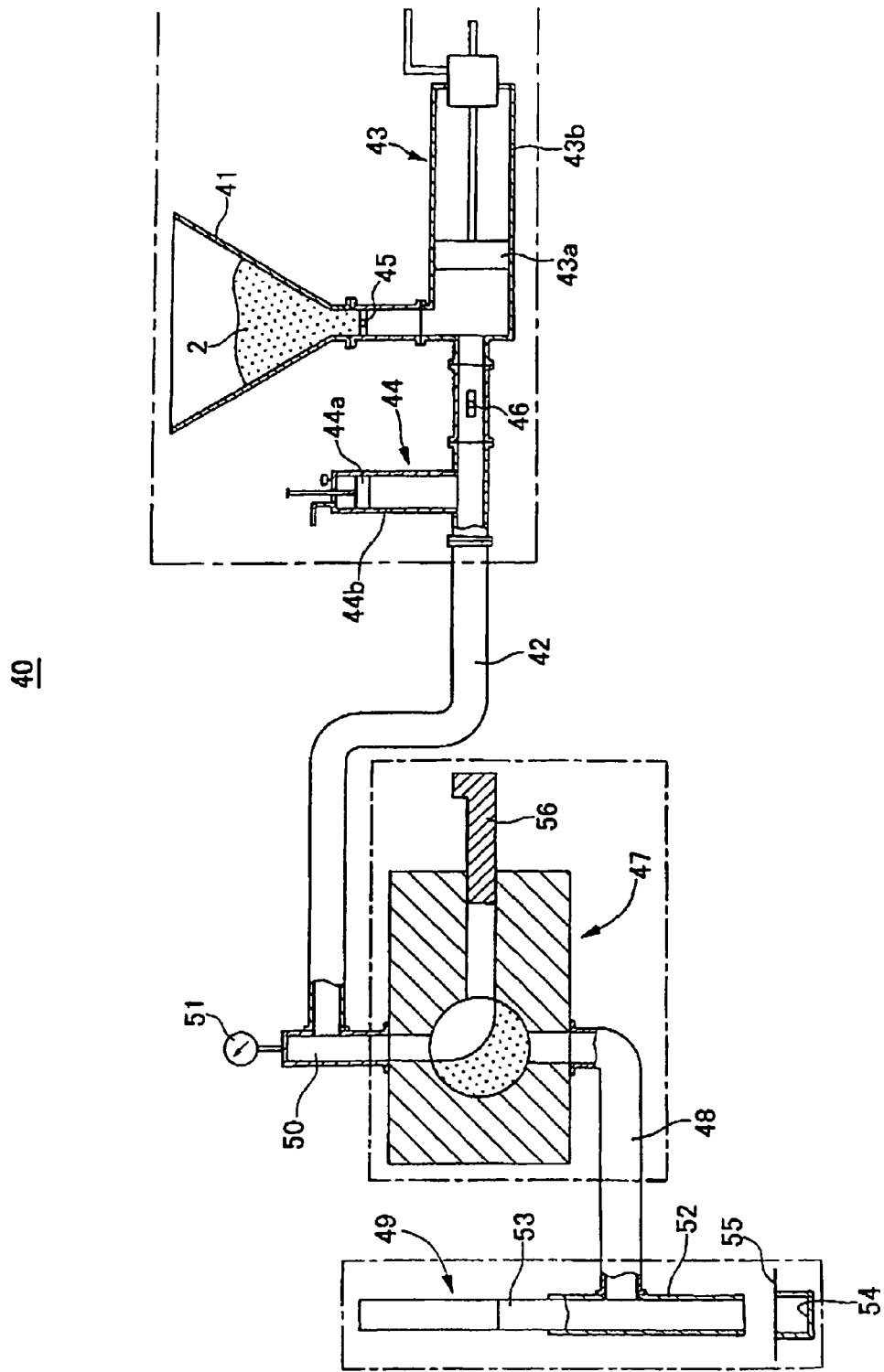
FIG. 5 is a schematic view showing a shao-mai manufacturing apparatus, to which the invention is applied.

FIG. 5 shows a shao-mai manufacturing apparatus using the present invention. The shao-mai manufacturing apparatus 40 includes a hopper 41, a first pipe 42, first and second piston pumps 43, 44, a draw-side valve 45, a discharge-side valve 46, a metering unit 47, a second pipe 48, and a molding section 49. The hopper 41, the first pipe 42, the first and second piston pumps 43, 44, the draw-side valve 45, the discharge-side valve 46, the metering unit 47, and the second pipe 48 being the same in construction as the hopper 3, the first pipe 4, the first and second piston pumps 31, 32, the draw-side valve 33, the discharge-side valve 34, the metering unit 5, and the second pipe 6 in the first and third embodiments described above.

The first piston pump 43 includes a first piston 43a with a stroke of 300 mm, and a first cylinder 43b having an inside diameter of 200 mm. The second piston pump 44 includes a second piston 44a with a stroke of 170 mm, and a second cylinder 44b having an inside diameter of 100 mm. The first pipe 42 is a pipe including bends midway in two locations and having an inside diameter of 97.6 mm and a length of 1.5 m, and a pressure gauge 51 is mounted in a connection pipe 50. The pressure gauge 51 is indicative of pressures in the first pipe 42 and the connection pipe 50, which connects a tip end of the first pipe 42 and the metering unit 47.

The molding section 49 is provided backwardly of the metering unit 47, and includes a periodically reciprocating molding nozzle 52, a molding piston 53 arranged in the molding nozzle, and a molding hole 54. While the molding nozzle 52 descends to push shao-mai skin 55 placed on the molding hole 54 into the molding hole 54, molding piston 53 descends to press out the foodstuff 2, which is fed in fixed quantity from the metering unit 47, to strike the same into the shao-mai skin 55, thus molding shao-mai.

Using the shao-mai manufacturing apparatus 40 described above, shrimp shao-mai was manufactured. The foodstuff 2 was prepared according to common methods of manufacturing ingredients of shao-mai by applying prearrangement to thawed skinned shrimp having a weight of 0.9 g to 1.5 g per piece, and mixing the shrimp with minced marine meat, starch, salt, condiment, etc. so that shrimp amounted to 25 weight % of the entire foodstuff. Ingredients of 12 g were used per one piece of shao-mai and shrimp contained in one piece of shao-mai amounted to 3 g.

An appropriate quantity of the foodstuff 2 was charged into the hopper 41, and the first piston pump 43 was started up under sequence control. In the sequence of control, the draw-side valve 45 was first opened and the first piston 43a was pulled to draw the foodstuff 2 into the first cylinder 43b. Subsequently, the draw-side valve 45 was closed and the discharge-side valve 46 was opened to permit the first piston 43a to be pushed toward a discharge side, so that the foodstuff 2 was fed into the first pipe 42. When the first piston 43a reached a lower limit, the discharge-side valve 46 was closed and the draw-side valve 45 was opened, so that the first piston 43a was pulled to draw the foodstuff 2. These operations were repeated until the foodstuff 2 reached an inlet of the metering unit 47. When the foodstuff 2 reached the metering unit 47, the foodstuff 2 entered into the second cylinder 44b. Since pressure at which the second piston pump 44 was pushed, was set to be a little lower than pressure at which the first piston pump 43 was pushed, until the second cylinder 44b was filled with the foodstuff 2, it was possible to gradually fill the foodstuff without substantially fluctuating the pressure in the first pipe 42. When the metering unit 47 was put in a stopped state, a state was held, in which interiors of the first pipe 42 and the second cylinder 44b up to the metering unit 47 were filled with the foodstuff 2. At this time, pressure in the piping depends upon the pressure at which the first piston pump 43 was pushed, to be balanced.

Subsequently, the metering unit 47 and the molding section 49 interlocking with the metering unit 47 were started up. The metering unit 47 and the molding section 49 were set to perform one cycle of operation in one second, and pressure, at which the first piston pump 43 was pushed, was regulated so that in operation the pressure gauge 51 at the inlet of the metering unit 47 indicated 0.12 MPa. Further, a metering piston 56 was regulated in stroke so that foodstuff used for molding one time amounted to 12 g. In this state, shao-mai skin 55 was fed to a top of the molding hole 54 for molding of shao-mai.

In the case where the first piston 43a reached the lower limit during the feeding of the foodstuff 2, the procedure shifted to the drawing operation, at which the foodstuff 2 in the second cylinder 44b was pressed out into the first pipe 42 while pressure at which the second piston pump 44 was pushed, was raised to maintain the pressure existing heretofore in the first pipe 42. Until the completion of pressing-out from the second cylinder 44b, the first cylinder 43b completed the drawing action and stood by in a state of being applied by pressure. After the second piston pump 44 reached a lower limit, the discharge-side valve 46 was opened to reopen pressing-out by the first piston pump 43. In the meantime, pressure in the first pipe 42 was incessantly held and the foodstuff 2 was continuously fed to the metering unit 47.

COMPARATIVE EXAMPLE

A shao-mai manufacturing apparatus (manufactured by Izumi Food Machinery Ltd., GS-A type) of a type in conventional examples, including squeezing blades and a gear pump and including the same metering unit and the same the molding section as those in the method of the invention described in the present embodiment was used. The same the foodstuff was used, setting was made to use ingredients of 12 g per piece, and thus molding of shao-mai was performed.

According to the method, shao-mai was continuously molded and shrimp contained in 100 molded products was evaluated in terms of weight. Since shrimp of 3 g was contained in one piece, shrimp of 300 g was contained in 100 pieces in calculation. Among molded ingredients for shao-mai, all visually discriminable shrimp was taken out to divide the same into ones, in which body length amounted to at least ½ of the original form, and ones, in which body length amounted to less than ½ of the original form, and a total weight of each of the two groups was measured. Also, a weight of shrimp incapable of discrimination due to loss of appearance was calculated by subtracting the weight of the two groups capable of visual discrimination, from the total weight of 300 g in calculation. It was beforehand revealed in separate examinations conducted by the inventors of the present application that the food feeling of shrimp amounting to at least ½ of among such products was felt when the products were heated as by steaming or the like and eaten as shrimp shao-mai and less than ½ of the products was not contributory to the food feeling.

With respect to the embodiments and the comparative examples, results of weight measurement according to the state of shrimp when shrimp shao-mai was molded are indicated in Table 1.

TABLE 1

| | Embodiment (g) | Comparative Example (g) |
|---|---|---|
| Body length amounting to at least ½ of that of original form | 222.4 | 99.1 |

TABLE 1-continued

|  | Embodiment (g) | Comparative Example (g) |
|---|---|---|
| Body length amounting to less than ½ that of original form | 54.3 | 104.6 |
| Quantity incapable of discrimination due to loss of appearance | 23.3 | 96.3 |
| Calculated value of total quantity of shrimp | 300.0 | 300.0 |

As indicated in Table 1, products retaining at least ½ of an original form amount to 99.1 g and about 33 weight % of the total quantity in the comparative examples while such products in the embodiments amount to 222.4 g and about 74 weight % of the total quantity and a remaining quantity corresponds to twice that in the comparative examples. Also, a quantity of shrimp incapable of discrimination due to loss of appearance, was 96.3 g in the comparative examples while it was 23.3 g in the embodiments to correspond to at most ¼ of that in the comparative examples.

Also, when shrimp shao-mai molded in the embodiments and the comparative examples were steamed in a steamer and eaten, shrimp shao-mai molded in the comparative examples presented little feeling of existence for shrimp while shrimp shao-mai molded in the embodiments evidenced existence of two or three shrimp pieces in one piece of shao-mai having the springy and resilient food feeling and was preferable in quality.

Figure 6:
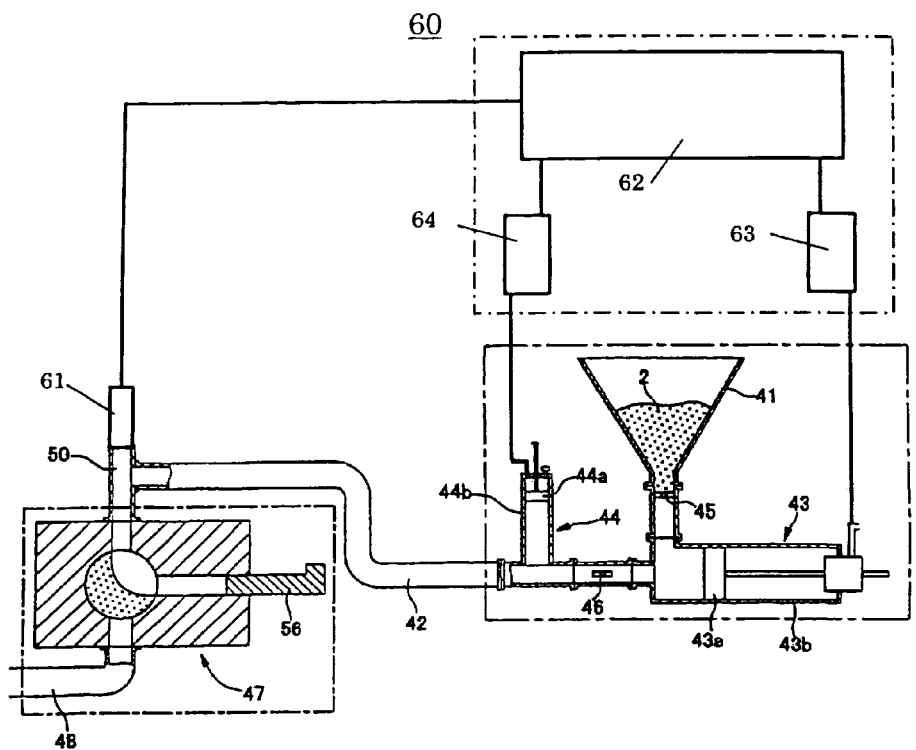
FIG. 6 is a schematic view showing a foodstuff feeding apparatus according to a fifth embodiment of the invention.

FIG. 6 is a fifth embodiment of the invention, in which a pressure sensor, electropneumatic regulators, and a sequencer are provided so as to control the pressure in a first pipe 42 to a predetermined value, and the same constituents as those in the embodiment depicted in FIG. 5 are denoted by the same reference numerals, for which a detailed explanation is omitted. With a foodstuff feeding apparatus 60 according to the fourth embodiment, a pressure sensor 61 to measure the pressure in the first pipe 42 and in a connection pipe is provided on the connection pipe, which connects between a tip end of the first pipe 42 and a metering unit 47. Also, the sequencer 62, the electropneumatic regulator 63, and the electropneumatic regulator 64 are mounted in a control panel for pressure control. Wiring for input of a pressure value is installed from the pressure sensor 61 to the sequencer 62, and wiring is installed from the sequencer 62 to the respective electropneumatic regulators 63 and 64 to transmit an electrical signal. A pipe from the electropneumatic regulator 63 to a first piston pump 43, and a pipe from the electropneumatic regulator 64 to an air introduction portion of a second piston pump 44 are installed to feed an air at a pressure which is regulated. Although not described here in detail, an electromagnetic valve, a transformer, a breaker, etc., which are used for general control circuits, are provided.

With the foodstuff feeding apparatus 60 described above, the sequence of actions of the respective pistons and the respective valves is the same as that in the third embodiment, and a detailed explanation therefore is omitted. Having received a pressure value from the pressure sensor 61, the sequencer 62 calculates a set value for the electropneumatic regulators on the basis of a deviation between the pressure value and the set value, and an increase and decrease in the pressure value and feeds a control signal to the electropneumatic regulators, thereby controlling the pressure in the first piston pump 43 to make the same close to the set value. Such control method is not especially limited but can adopt methods generally carried out and typified by, for example, derivative control, integral control, PID control, or the like.

Since foodstuff intermittently entered into a metering unit during molding, it was estimated that a pressure value in the first pipe, measured by the pressure sensor, would fluctuate. Therefore, the sequencer was programmed such that an average value of a maximum value and a minimum value among pressure values measured for ten seconds was calculated to make a present pressure value used for control. While such method was adopted this time, there is conceivable a method of integrating pressure values for a predetermined period of time to make an average pressure value, or the like.

A program was made such that the sequencer performed a control action once in ten seconds to calculate a pressure value, calculate set values for the electropneumatic regulators, and to feed control signals to the electropneumatic regulators. The sequencer was programmed such that when a difference between a pressure set value and a present pressure value exceeded 0.003 MPa, the set values for the electropneumatic regulators were increased and decreased a value of the difference so as to remove the difference.

That is, when the pressure set value was 0.16 MPa and the present pressure value was 0.155 MPa, a difference therebetween was 0.005 MPa and exceeded 0.003 MPa, and so a control signal was forwarded so that the electropneumatic regulators were raised in pressure by 0.005 MPa.

Subsequently, shrimp shao-mai was manufactured with the use of a shao-mai molding apparatus 60 depicted in FIG. 6. Pressure in the first pipe was set to 0.16 MPa, and after the sequencer was started, the piston pumps and the molding machine were started to begin molding.

After control was performed several times immediately after the start of molding, a present pressure value became stable in the vicinity of 0.16 MPa. Thereafter, when the present pressure value gradually increased or decreased and a difference between it and the pressure set value exceeded 0.003 MPa, an action was confirmed, in which control was performed and the present pressure value returned to around 0.16 MPa.

Figure 7:
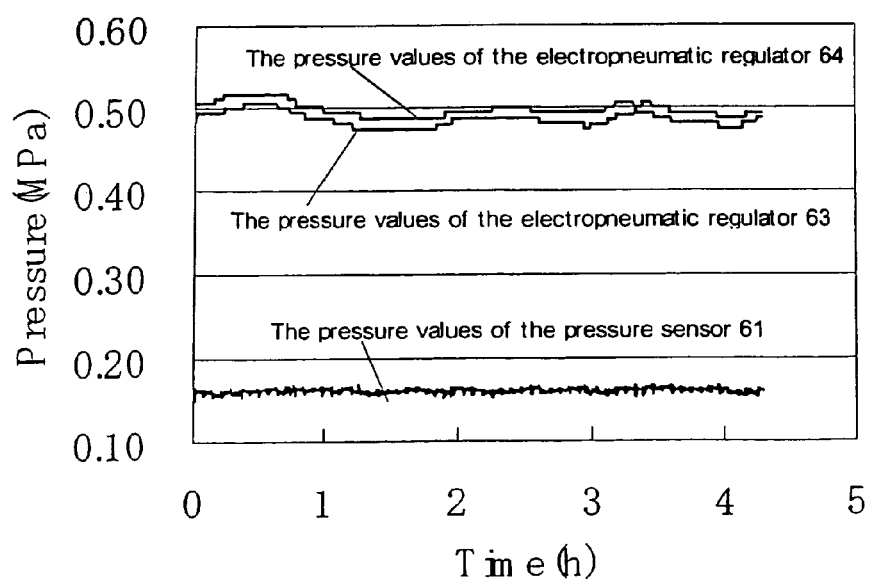
FIG. 7 is a graph representation of pressure valves for electropneumatic regulators shown in FIG. 6.

FIG. 7 is a graph representative of present pressure values, pressure values of the electropneumatic regulator 63, and pressure values of the electropneumatic regulator 64, which were recorded making use of the function of the sequencer. During the continuous operation for four hours and more, the pressure value of the electropneumatic regulator 64 changed between 0.47 MPa and 0.50 MPa, and the pressure value of the electropneumatic regulator 63 changed between 0.49 MPa and 0.52 MPa. That is, a maximum pressure difference of 0.03 MPa resulted in the respective pressure values. On the other hand, the pressure in the first pipe 42 was fixed at 0.16 MPa.

It is believed that if the fifth embodiment were not used, the pressure in the first pipe 42 would change by 0.03 MPa at maximum. A separate examination conducted by the inventors of the present application has revealed that when a pressure difference in the first pipe 42 was 0.03 MPa, a variation of the order of 3.3% was produced in weight of molded products. In this case, such occasion that molded products are off the weight standard arises, and such molded products cannot be shipped as finished ones to generate waste. The fifth embodiment is used to eliminate such waste and enable production with a stable weight.

ADVANTAGES OF THE INVENTION

According to the first aspect of the invention, the piston pump is used for conveyance of foodstuff so that no continuously rotating mechanism is needed in a foodstuff conveyance region from the hopper to the metering unit, whereby it is possible to convey the foodstuff in its original form to the metering unit without shearing, cutting, mashing, or kneading the foodstuff. Also, the pressure at which foodstuff is pressed out can be readily made constant.

According to the second aspect of the invention, the plurality of piston pumps are alternately operated for drawing and pressing-out whereby foodstuff is incessantly pressed out the first pipe, so that it is possible to efficiently convey foodstuff to the metering unit.

According to the third invention, the metering unit also divides foodstuff in fixed quantities with the use of a metering piston, so that it is possible to convey foodstuff in its original form from the metering unit to a subsequent process without mashing, or kneading the foodstuff.

According to the fourth aspect of the invention, by controlling the pressure in the first pipe in the vicinity of the metering unit to a predetermined value, it is not necessary to manually regulate setting of the apparatus even in the event of generation of such cause for pressure fluctuation in the pipe, as temperature change in the apparatus and foodstuff, changes of foodstuff in physical property, caused by dispersion of materials used for foodstuff and dispersion of pretreatment such as mixing, etc., and changes of foodstuff in physical property, caused by changes in blending, etc., and it is possible to convey and feed foodstuff at a fixed pressure.

According to the fifth aspect of the invention, the foodstuff feeding apparatus is used for conveyance and feeding of foodstuff whereby it is possible to manufacture foodstuff of high quality near to being made manually without mashing, or kneading the foodstuff during conveyance.

According to the sixth aspect of the invention, it is possible to convey and feed shrimp, of which a springy and resilient food feeling is preferred, without mashing or kneading, thus enabling achieving an improvement in the quality of food in which shrimp is contained.

What is claimed is:

1. A foodstuff feeding apparatus comprising:
   a hopper configured to be charged with foodstuff;
   a first pipe, through which foodstuff is conveyed from the hopper;
   a metering unit configured to divide the foodstuff conveyed through the first pipe in fixed quantities for use in a subsequent process;
   a piston pump provided between a lower portion of the hopper and a hopper-side end of the first pipe to draw the foodstuff from the hopper and to press out the drawn foodstuff into the first pipe;
   a draw-side valve provided between the lower portion of the hopper and the piston pump; and
   a discharge-side valve provided between the piston pump and the first pipe,
   wherein said apparatus is configured such that the piston pump draws the foodstuff from the hopper when the draw-side valve is opened and the discharge-side valve is closed, and the piston pump presses out the foodstuff into the first pipe when the draw-side valve is closed and the discharge-side valve is opened.

2. The foodstuff feeding apparatus according to claim 1, wherein a plurality of piston pumps are provided at the lower portion of the hopper, the draw-side valve is configured to selectively connect between the hopper and draw ports of the respective piston pumps, and the discharge-side valve provided to selectively connect between the first pipe and discharge ports of the respective piston pumps, and wherein said apparatus is configured such that while one piston pump of the plurality of piston pumps is pressing out the foodstuff, another piston pump of the plurality of piston pumps draws the foodstuff from the hopper.

3. The foodstuff feeding apparatus according to claim 1, wherein the metering unit comprises:
   three-way passages including a first switchover passage communicated with the first pipe, a second switchover passage communicated with a second pipe leading to the subsequent process, and a third switchover passage communicated with a metering piston; and
   a switchover cock provided at an intersection of the three-way passages,
   wherein the metering piston is caused by a reciprocating drive device to draw and press out foodstuff,
   wherein the switchover cock is turned by a rotary drive device to be alternately stopped in a first position in which the first switchover passage and the third switchover passage are communicated with each other, and in a second first position in which the second switchover passage and the third switchover passage are communicated with each other, and
   wherein said apparatus is configured such that when the switchover cock is stopped in the first position, the metering piston draws foodstuff from the first pipe through the switchover cock, and when the switchover cock is stopped in the second position, the metering piston presses out foodstuff into the second pipe through the switchover cock.

4. The foodstuff feeding apparatus according to claim 2, wherein the metering unit comprises:
   three-way passages including a first switchover passage communicated with the first pipe, a second switchover passage communicated with a second pipe leading to the subsequent process, and a third switchover passage communicated with a metering piston; and
   a switchover cock provided at an intersection of the three-way passages,
   wherein the metering piston is caused by a reciprocating drive device to draw and press out foodstuff,
   wherein the switchover cock is turned by a rotary drive device to be alternately stopped in a first position in which the first switchover passage and the third switchover passage are communicated with each other, and in a second first position in which the second switchover passage and the third switchover passage are communicated with each other, and
   wherein said apparatus is configured such that when the switchover cock is stopped in the first position, the metering piston draws foodstuff from the first pipe through the switchover cock, and when the switchover cock is stopped in the second position, the metering piston presses out foodstuff into the second pipe through the switchover cock.

5. A foodstuff feeding apparatus comprising:
   a hopper configured to be charged with foodstuff;
   a first pipe, through which foodstuff is conveyed from the hopper;
   a metering unit configured to divide the foodstuff conveyed through the first pipe in fixed quantities for use in a subsequent process;
   a draw-side valve provided at the lower portion of the hopper;
   a discharge-side valve provided along the first pipe; and means for drawing the foodstuff from the hopper when the draw-side valve is opened and the discharge-side valve is closed, and for pressing out the foodstuff into the first pipe when the draw-side valve is closed and the discharge-side valve is opened.

6. The foodstuff feeding apparatus according to claim 5, wherein a plurality of means for drawing and pressing are provided at the lower portion of the hopper, the draw-side valve is configured to selectively connect between the hopper and draw ports of the respective means, and the discharge-side valve provided to selectively connect between the first pipe and discharge ports of the respective means, and wherein said apparatus is configured such that while one means for drawing and pressing is pressing out the foodstuff, another means for drawing and pressing draws the foodstuff from the hopper.

7. The foodstuff feeding apparatus according to claim 5, wherein the metering unit comprises:
   three-way passages including a first switchover passage communicated with the first pipe, a second switchover passage communicated with a second pipe leading to the subsequent process, and a third switchover passage communicated with a metering piston; and
   a switchover cock provided at an intersection of the three-way passages,
   wherein the metering piston is caused by a reciprocating drive device to draw and press out foodstuff,
   wherein the switchover cock is turned by a rotary drive device to be alternately stopped in a first position in which the first switchover passage and the third switchover passage are communicated with each other, and in a second first position in which the second switchover passage and the third switchover passage are communicated with each other, and
   wherein said apparatus is configured such that when the switchover cock is stopped in the first position, the metering piston draws foodstuff from the first pipe through the switchover cock, and when the switchover cock is stopped in the second position, the metering piston presses out foodstuff into the second pipe through the switchover cock.

8. The foodstuff feeding apparatus according to claim 6, wherein the metering unit comprises:
   three-way passages including a first switchover passage communicated with the first pipe, a second switchover passage communicated with a second pipe leading to the subsequent process, and a third switchover passage communicated with a metering piston; and
   a switchover cock provided at an intersection of the three-way passages,
   wherein the metering piston is caused by a reciprocating drive device to draw and press out foodstuff,
   wherein the switchover cock is turned by a rotary drive device to be alternately stopped in a first position in which the first switchover passage and the third switchover passage are communicated with each other, and in a second first position in which the second switchover passage and the third switchover passage are communicated with each other, and
   wherein said apparatus is configured such that when the switchover cock is stopped in the first position, the metering piston draws foodstuff from the first pipe through the switchover cock, and when the switchover cock is stopped in the second position, the metering piston presses out foodstuff into the second pipe through the switchover cock.

9. A method of feeding foodstuff to a metering unit from a hopper using a foodstuff feeding apparatus comprising a hopper configured to be charged with foodstuff, a first pipe, through which foodstuff is conveyed from the hopper, a metering unit configured to divide the foodstuff conveyed through the first pipe in fixed quantities for use in a subsequent process, a piston pump provided between a lower portion of the hopper and a hopper-side end of the first pipe to draw the foodstuff from the hopper and to press out the drawn foodstuff into the first pipe, a draw-side valve provided between the lower portion of the hopper and the piston pump, and a discharge-side valve provided between the piston pump and the first pipe, said method comprising:
   drawing foodstuff charged into the hopper into a cylinder of the piston pump by opening the draw-side valve, closing the discharge-side valve, and actuating the piston pump; and
   pressing out the foodstuff in the cylinder into the first pipe by closing the draw-side valve, opening the discharge-side valve, and actuating the piston pump.

10. The foodstuff feeding method according to claim 9, wherein the foodstuff is continuously conveyed to the metering unit through the first pipe.

11. The foodstuff feeding method according to claim 9, wherein a plurality of piston pumps are provided at the lower portion of the hopper, the draw-side valve is configured to selectively connect between the hopper and draw ports of the respective piston pumps, and the discharge-side valve provided to selectively connect between the first pipe and discharge ports of the respective piston pumps, and wherein said method includes pressing out the foodstuff using one piston pump of the plurality of piston pumps, while drawing the foodstuff from the hopper using another piston pump of the plurality of piston pumps.

12. The foodstuff feeding method according to claim 9, wherein the metering unit comprises:
   three-way passages including a first switchover passage communicated with the first pipe, a second switchover passage communicated with a second pipe leading to the subsequent process, and a third switchover passage communicated with a metering piston; and
   a switchover cock provided at an intersection of the three-way passages,
   wherein the metering piston is caused by a reciprocating drive device to draw and press out foodstuff,
   wherein the switchover cock is turned by a rotary drive device to be alternately stopped in a first position in which the first switchover passage and the third switchover passage are communicated with each other, and in a second first position in which the second switchover passage and the third switchover passage are communicated with each other, and
   wherein the apparatus is configured such that when the switchover cock is stopped in the first position, the metering piston draws foodstuff from the first pipe through the switchover cock, and when the switchover cock is stopped in the second position, the metering piston presses out foodstuff into the second pipe through the switchover cock.

13. The foodstuff feeding method according to claim 11, wherein the metering unit comprises:
   three-way passages including a first switchover passage communicated with the first pipe, a second switchover passage communicated with a second pipe leading to the subsequent process, and a third switchover passage communicated with a metering piston; and a switchover cock provided at an intersection of the three-way passages, wherein the metering piston is caused by a reciprocating drive device to draw and press out foodstuff, wherein the switchover cock is turned by a rotary drive device to be alternately stopped in a first position in which the first switchover passage and the third switchover passage are communicated with each other, and in a second first position in which the second switchover passage and the third switchover passage are communicated with each other, and wherein the apparatus is configured such that when the switchover cock is stopped in the first position, the metering piston draws foodstuff from the first pipe through the switchover cock, and when the switchover cock is stopped in the second position, the metering piston presses out foodstuff into the second pipe through the switchover cock.

14. The foodstuff feeding method according to claim 9, wherein shrimp is contained in the foodstuff.

* * * * *